US009871999B2

(12) United States Patent
Kardashov

(10) Patent No.: US 9,871,999 B2
(45) Date of Patent: Jan. 16, 2018

(54) MODULAR CAMERA MONITORING SYSTEMS AND METHODS

(71) Applicant: FLIR Systems, Inc., Wilsonville, OR (US)

(72) Inventor: Vlad Kardashov, Ontario (CA)

(73) Assignee: FLIR Systems, Inc., Wilsonville, OR (US)

( * ) Notice: Subject to any disclaimer, the term of this patent is extended or adjusted under 35 U.S.C. 154(b) by 488 days.

(21) Appl. No.: 14/324,023

(22) Filed: Jul. 3, 2014

(65) Prior Publication Data

US 2015/0009325 A1  Jan. 8, 2015

Related U.S. Application Data

(60) Provisional application No. 61/843,235, filed on Jul. 5, 2013.

(51) Int. Cl.
| H04N 9/47 | (2006.01) |
| H04N 5/77 | (2006.01) |
| H04N 7/18 | (2006.01) |
| H04N 5/232 | (2006.01) |
| G08B 19/00 | (2006.01) |
| G08B 13/196 | (2006.01) |

(52) U.S. Cl.
CPC ............ *H04N 7/183* (2013.01); *G08B 19/00* (2013.01); *H04N 5/23225* (2013.01); *G08B 13/19621* (2013.01); *G08B 13/19654* (2013.01)

(58) Field of Classification Search
USPC .................................. 348/143; 386/223–230
See application file for complete search history.

(56) References Cited

U.S. PATENT DOCUMENTS

| 6,006,039 | A | * | 12/1999 | Steinberg | ................ | G03B 7/091 |
| | | | | | | 348/E5.043 |
| 7,742,625 | B2 | | 6/2010 | Pilu | | |
| 7,822,545 | B2 | * | 10/2010 | Kanda | ................ | G01C 21/3632 |
| | | | | | | 340/995.19 |
| 2006/0087560 | A1 | | 4/2006 | Moran et al. | | |
| 2006/0098088 | A1 | * | 5/2006 | Raghunath | ............. | H04N 5/782 |
| | | | | | | 348/61 |

(Continued)

FOREIGN PATENT DOCUMENTS

| GB | 2398696 | 8/2004 |
| GB | 2433172 | 6/2007 |

(Continued)

*Primary Examiner* — Nigar Chowdhury
(74) *Attorney, Agent, or Firm* — Haynes and Boone, LLP

(57) ABSTRACT

Techniques are disclosed for systems and methods to provide monitoring systems including one or more modular cameras and at least one application-specific base. The application-specific base may include features and/or components corresponding to a particular type of monitoring. A monitoring system includes at least one modular camera that first establishes a communication link with an application-specific base and then downloads a monitoring system application corresponding to the application-specific base. After a modular camera receives the monitoring system application, the modular camera performs the application in order to capture monitoring information corresponding to the particular type of monitoring supported by the application-specific base.

20 Claims, 10 Drawing Sheets

(56) References Cited

U.S. PATENT DOCUMENTS

| | | | |
|---|---|---|---|
| 2007/0182818 A1* | 8/2007 | Buehler | G08B 13/19602 348/143 |
| 2008/0075255 A1* | 3/2008 | Nguyen | H04L 12/1818 379/202.01 |
| 2008/0288986 A1* | 11/2008 | Foster | G08B 13/19656 725/62 |
| 2009/0040301 A1* | 2/2009 | Sandler | H04N 7/181 348/143 |
| 2009/0322890 A1* | 12/2009 | Bocking | G03B 17/00 348/211.2 |
| 2010/0007736 A1* | 1/2010 | Mori | G08B 13/19608 348/155 |
| 2010/0222179 A1* | 9/2010 | Temple | A63B 24/0062 482/8 |
| 2011/0018998 A1* | 1/2011 | Guzik | H04N 21/21 348/143 |
| 2012/0113265 A1 | 5/2012 | Galvin | |
| 2012/0219271 A1* | 8/2012 | Vunic | G06K 9/00711 386/278 |
| 2013/0142504 A1 | 6/2013 | Warren et al. | |
| 2013/0231760 A1* | 9/2013 | Rosen | G06F 17/40 700/91 |
| 2014/0146171 A1* | 5/2014 | Brady | H04N 7/188 348/143 |

FOREIGN PATENT DOCUMENTS

| | | |
|---|---|---|
| WO | WO 2002/041273 | 5/2002 |
| WO | WO 2011/092553 | 8/2011 |

\* cited by examiner

MODULAR CAMERA MONITORING SYSTEMS AND METHODS

CROSS-REFERENCE TO RELATED APPLICATIONS

This application claims the benefit of U.S. Provisional Patent Application No. 61/843,235 filed Jul. 5, 2013 and entitled "MODULAR CAMERA MONITORING SYSTEMS AND METHODS" which is hereby incorporated by reference in its entirety.

TECHNICAL FIELD

One or more embodiments of the invention relate generally to imaging systems and more particularly, for example, to systems and methods for monitoring systems including modular cameras.

BACKGROUND

Monitoring systems are increasingly being used as a security and/or safety stop-gap to replace and/or supplement direct human monitoring of various environments, such as residences, industrial areas, schools, and storage areas. Monitoring systems can provide almost constant and typically reliable recorded monitoring of such fixed environments.

However, conventional monitoring systems are relatively expensive and/or difficult to install if it is desired that the monitoring be seamless, at least visually. Moreover, visual monitoring systems typically do not operate well without proper illumination, particularly at night, and mitigating technology, such as illuminators and/or conventional infrared imagers, are relatively expensive. Furthermore, conventional monitoring systems are typically fixed in place and cannot be used reliably to monitor mobile environments, such as environments surrounding people, pets, and or vehicles. Thus, there is a need for an improved methodology for monitoring systems that is easier and more adaptable to install, includes relatively inexpensive components, and can be used to monitor mobile environments reliably.

SUMMARY

Techniques are disclosed for systems and methods to provide monitoring systems including a modular camera and/or an application-specific base. The application-specific base may include features and/or components corresponding to a particular type of monitoring. In one embodiment, a monitoring system may include a modular camera adapted to establish a communication link with an application-specific base and then download a monitoring system application corresponding to the application-specific base. After receiving the monitoring system application, the modular camera may perform the application and capture monitoring information corresponding to a particular type of monitoring, such as mobile baby monitoring, mobile elderly monitoring, mobile vehicular monitoring, home security/automation monitoring, industrial safety monitoring, pet monitoring, and/or other types of monitoring described herein.

In one embodiment, a monitoring system includes a modular camera adapted to interface with an application-specific base, wherein the modular camera may include an imaging module, a communication module, a GPS (Global Positioning System) receiver/module, a memory, and a processor in communication with the imaging and communication modules and the memory. In such embodiment, the processor may be adapted to establish a communication link with the application-specific base; download a monitoring system application corresponding to the application-specific base; and perform the monitoring system application to capture monitoring information, wherein the monitoring information includes image data captured by the imaging module and/or location data received by the GPS module according to the monitoring system application.

In another embodiment, a monitoring system includes an application-specific base adapted to interface with a modular camera, wherein the application specific base may include a communication module, a GPS, a memory, and a processor in communication with the communication module and the memory. In such embodiment, the processor may be adapted to establish a communication link with the modular camera; provide a monitoring system application, corresponding to the application-specific base, to the modular camera, wherein the monitoring system application is performed by the modular camera to capture monitoring information; and provide a remote monitoring system application, corresponding to the application specific base, to a personal electronic device, wherein the remote monitoring system application includes an interface adapted to provide remote access to the monitoring information.

In a further embodiment, a method includes establishing a communication link with an application-specific base, wherein the application-specific base is adapted to interface with a modular camera; downloading a monitoring system application corresponding to the application specific base; and performing the monitoring system application to capture monitoring information (e.g., location data and/or other data), wherein the monitoring information includes image data captured by the modular camera according to the monitoring system application. In some embodiments, the method may include providing a remote monitoring system application, corresponding to the application specific base, to a personal electronic device, wherein the remote monitoring system application includes an interface adapted to provide remote access to the monitoring information.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
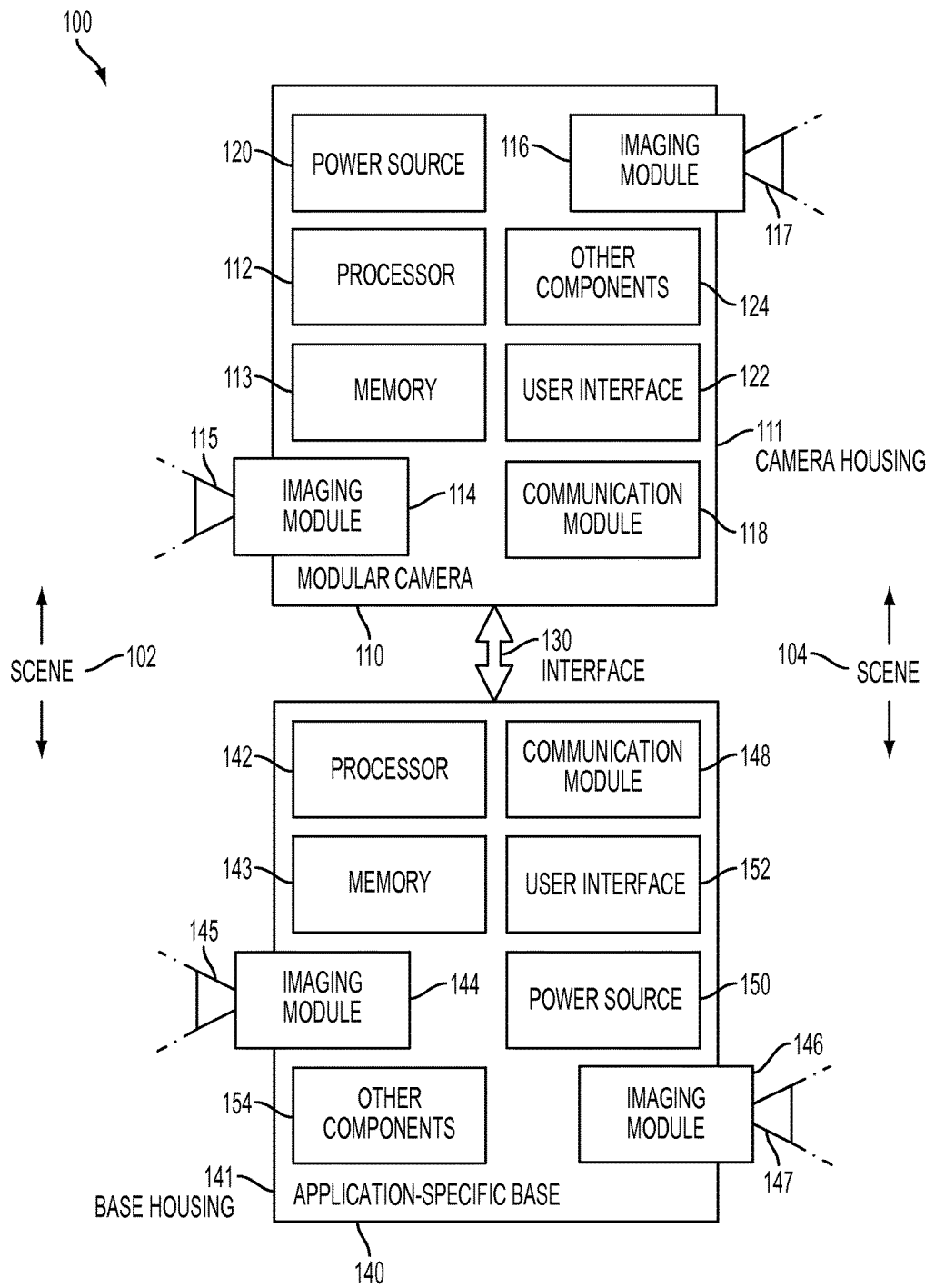
FIG. 1 illustrates a block diagram of a monitoring system in accordance with an embodiment of the disclosure.

In accordance with various embodiments of the present disclosure, monitoring systems and methods may advantageously include a modular camera that is adapted to interface with an application-specific base and capture monitoring information corresponding to the type of monitoring aided by the application-specific base. For example, a modular camera may be implemented inexpensively with a relatively small number of sensors (e.g., one or more imaging modules, an audio I/O module, a microphone module) and/or other components (e.g., a cellular modem, a wireless networking interface, a GPS module, a mobile power supply, a PIR (passive IR) module) but be able to interface with a variety of bases to selectively increase the functionality of the modular camera according to a particular monitoring system need. A modular camera may interface with one type of base and capture a first type of monitoring information for a period of time, and then be efficiently repurposed to capture a second type of monitoring information by subsequently interfacing with another type of base.

In some embodiments, an application-specific base may include one or more application-specific components adapted to facilitate a particular type of monitoring by a modular camera. For example, an application-specific base may include a mobile power source and/or a cellular modem or other type of wireless networking interface that, when coupled with a modular camera, provides a remotely accessible mobile monitoring system. In various embodiments, the application-specific base may be adapted to interface with a modular camera so as to provide access to a number of features, for example, such as extended operational power, various types of network communications, additional sensory inputs, various mounting adapters, additional processing resources (e.g., including memory), various output modalities and/or user interfaces, and/or features associated with other components or modules for use with the modular camera, such as other components 124/154 provided in FIG. 2.

The types of monitoring aided by corresponding bases may include mobile and/or stationary baby monitoring, elderly monitoring, vehicular monitoring, home security/automation monitoring, industrial safety monitoring, pet monitoring, and/or other types of monitoring described herein, for example. In various embodiments, an application-specific base may be adapted to provide a monitoring system application to an interfaced modular camera, where the modular camera is adapted to perform the monitoring system application in order to capture monitoring information corresponding to the type of monitoring associated with the application-specific base. In related embodiments, the application-specific base may be adapted to provide a remote monitoring system application to, for example, a personal electronic device, such as a laptop computer, a smartphone, a personal computer, and/or various other personal electronic devices. For example, the remote monitoring system application may include an interface or other type of remote access to monitoring information captured by the modular camera and/or the application-specific base, and/or to configuration settings for the camera, base, and/or the monitoring system application. The application-specific base may be configured to provide either or both the applications directly, for example, or may provide a code identifying a location (e.g., a URL, a network address, other coordinates, a physical data port, and/or other location) of the respective application that is accessible by the appropriate device.

FIG. 1 illustrates a block diagram of a monitoring system 100 in accordance with an embodiment of the disclosure. In the embodiment shown in FIG. 1, system 100 includes a modular camera 110 and application-specific base 140 adapted to interface with each other over an interface 130 and to monitor scene 102 and/or 104. Scenes 102, 104 may include respective front and rear facing scenes being monitored by monitoring system 100, such as a baby monitoring system adapted to monitor a baby (e.g., scene 102) and a caretaker or surrounding environment for the baby (e.g., scene 104), for example, or a home security/automation monitoring system adapted to monitor opposing views (e.g., scenes 102, 104) of a hallway or entrance.

In some embodiments, interface 130 may be implemented as a physical and/or rigid mount between camera housing 111 and base housing 141, for example, so as to fix camera 110 relative to base 140 while camera 110 is interfaced with base 140. In other embodiments, interface 130 may additionally or alternatively represent a communication link between camera 110 and base 140, such as a wired (e.g., a direct physical connection using serial port) and/or wireless communication link, where camera 110 and base 140 may or may not be in direct physical contact.

For example, in one embodiments, one or both of camera 110 and base 140 may be adapted to establish a communication link (e.g., interface 130) and maintain that communication link only while they are mounted to each other. In another embodiment, one or both of camera 110 and base 140 may be adapted to periodically search for each other, using one or more standard or proprietary wireless networking protocols, and then establish a communication link (e.g., interface 130) when within a particular range of each other. In some embodiments, the range may be selected to require at least momentary contact between camera 110 and base 140 to trigger forming interface 130. In other embodiments, the range may be selected to allow for simultaneous interfacing between multiple cameras and bases and formation of an extended monitoring system with multiple cameras and/or bases. Additionally, camera 110 and/or base 140 may communicate with external devices/accessories such as home automation sensors or devices using proprietary or standard wireless protocols.

In yet another embodiment, one or both of camera 110 and base 140 may be adapted to establish a communication link (e.g., interface 130) when camera 110 is physically mounted to base 140, and to maintain that communication link even when dismounted until, for example, a user indicates interface 130 should be terminated (e.g., using one of user interfaces 122/152). Through iterative physical mounting, a number of modular cameras may be interfaced with a single application specific base (e.g., base 140), thus forming an extended monitoring system with a plurality of cameras and one base. In related embodiments, additional bases may be incorporated into the extended monitoring system by establishing successive communication links with a single camera, for example, using similar processes.

Figure 2:
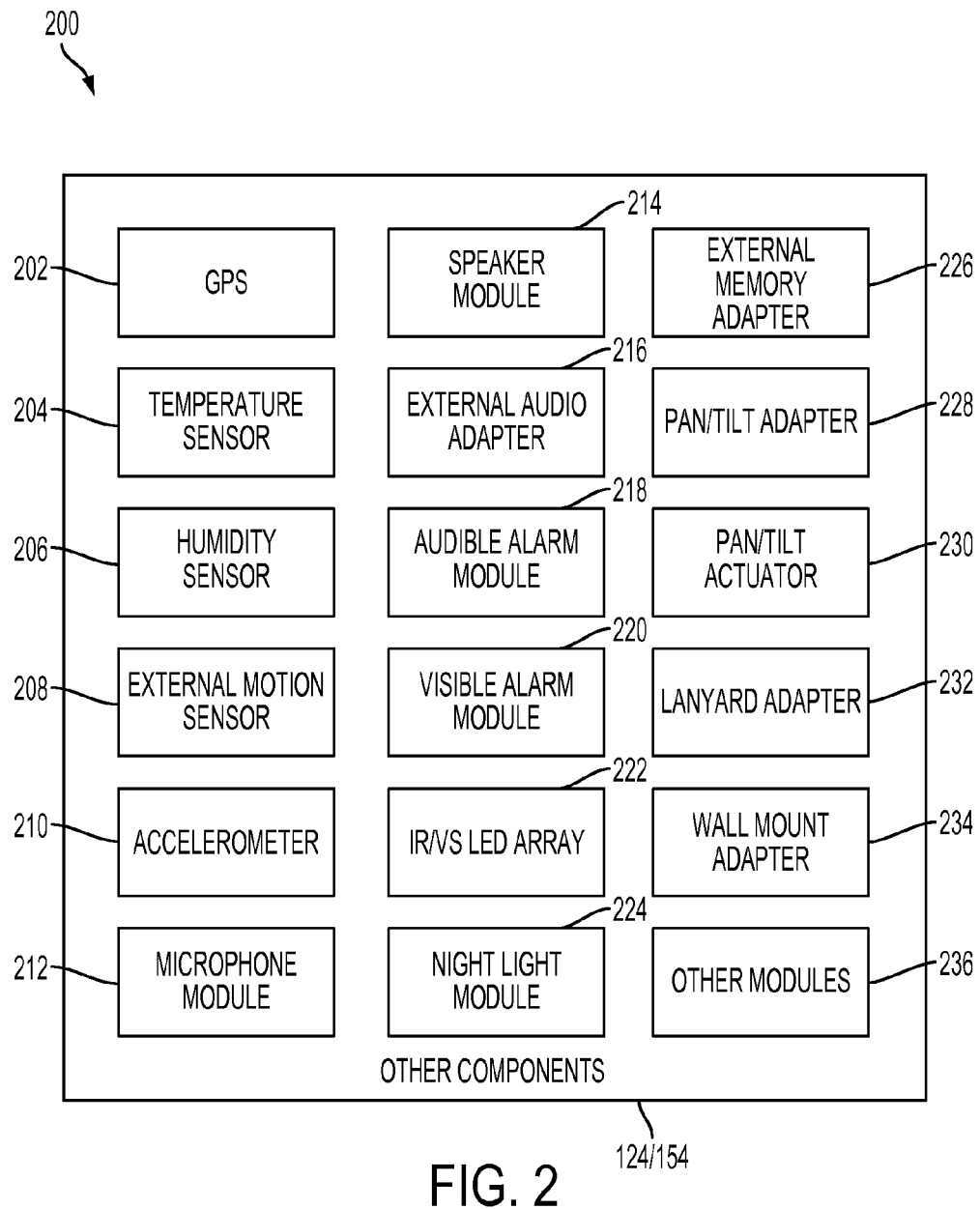
FIG. 2 illustrates a block diagram of a monitoring system in accordance with an embodiment of the disclosure.

As shown in FIG. 1, modular camera 110 may include camera housing 111, processor 112, memory 113, imaging module 114, optional rear facing imaging module 116, corresponding optical elements 115, 117, communication module 118, power source 120, user interface 122, and one or more other components 124 housed together by camera housing 111. In some embodiments, modular camera 110 may be implemented as a relatively compact imaging device (e.g., housing 110 may have dimensions less than 2"×2"×1") that can be configured for stand-alone operation as well as operation in cooperation with application specific base 140. For example, modular camera 110 may be implemented as a dedicated digital camera, a video capture device, and/or an audio capture device, with a selection of appropriate sensor modules, as shown in FIGS. 1 and 2. In one embodiment, modular camera 110 may be implemented as a smartphone, portable music player, or other relatively portable electronic device that includes one or more imaging modules, such as imaging modules 114, 116.

Camera housing 111 forms a protective enclosure while also providing a substantially rigid mounting structure in which to secure the various modules of modular camera 110. For example, camera housing 111 may be used to provide a particular relative orientation for imaging sensors 114, 116, and/or one or more other components 124 (e.g., a microphone, or an external motion sensor). Additionally, camera housing 111 may be shaped to provide a physical mount structure and/or locking/unlocking mechanism for physically interfacing and de-interfacing camera 110 to base 140. Camera housing 111 may be formed from metal, plastic, ceramic, or any combination of those and other materials, for example. In some embodiments, camera housing 111 may be implemented as a substantially hermetically sealed housing providing protection against physical shock and/or moisture or other types of environmental contamination. In other embodiments, any protective nature of camera housing 111 may be supplemented by base housing 141 while camera 110 is physically interfaced with base 140. For example, application-specific base 140 may be adapted to facilitate outdoor security monitoring and provide, in addition to a physical mount, an enclosure hardened against typical outdoor contaminants (e.g., moisture, particulates, pollution, and/or ultraviolet radiation).

Processor 112 may be implemented as any appropriate processing device (e.g., logic device, microcontroller, processor, application specific integrated circuit (ASIC), or other device) that may be used by camera 110 to execute appropriate instructions, such as software instructions of a monitoring system application provided in memory 113. In some embodiments, at least some portion or some functionalities of processor 112 described herein may be implemented as part of an imaging module (e.g., imaging modules 114, 116), for example, or may be part of or implemented with other existing processors of separate devices, such as base 140, a server, a personal electronic device (e.g., a mobile phone, smartphone, tablet device, laptop computer, desktop computer), and/or any other devices that may be used to process and/or present monitoring information captured by monitoring system 100. In other embodiments, processor 112 may interface and communicate with various external processors and associated components, such as processor 142 of base 140, as well as any components associated with base 140, and/or perform various operations in a distributed manner.

In general, processor 112 may be adapted to interface and communicate with other components of system 100 to perform various methods and processes described herein. For example, processor 112 may be adapted to establish a communication link (e.g., interface 130) with base 140 (e.g., processor 142 and/or other components of base 140) using communication module 118, as described herein. Upon establishing the communication link, processor 112 may download or otherwise receive data from base 140, such as a code indicating a location of a monitoring system application, the monitoring system application itself, configuration settings, various sensor data, and/or other monitoring information and/or applications, for example. In some embodiments, processor 112 may provide configuration settings, sensor data, other monitoring information, requests for sensor data, and/or other data to base 140 over the established communication link.

In embodiments where processor 112 is provided a code indicating a location of a monitoring system application, processor 112 may be adapted to establish a communication link with the location to download the monitoring system application for storage, such as in memory 113. For example, if the location is a URL, network address, and/or server accessible over a network, such as the Internet, other wide area networks (WANs), and/or a local area network (LAN), processor 112 may be adapted to use communication module 118 to establish an appropriate communication link and download the monitoring system application from the location. If the location is a physical data port, such as a USB port or memory card port of camera 110 or base 140, processor 112 may be adapted to use communication module 118 to establish a communication link with the physical data port and download the monitoring system application. Similar processes may be used by processor 112 to download a remote monitoring system application, which may then be provided to base 140 and/or a personal electronic device, as described herein.

Once processor 112 is in possession of a monitoring system application, processor 112 may be adapted to perform the monitoring system application to capture corresponding monitoring information. For example, the monitoring information may include image data (e.g., including video data) captured by one or both imaging modules 114, 116, and/or other sensor data captured by one or more other components of camera 110 and/or base 140. In various embodiments, sensor data may be captured according to a schedule, a particular light level, a motion trigger, a sound trigger, an available power, a particular orientation, location, and/or according to other procedural specifications provided by the monitoring system application and/or various configuration settings. Processor 112 may be adapted (e.g., by the monitoring system application) to process the monitoring information to determine various characteristics of scenes 102 and/or 104, according to the type of monitoring corresponding to application-specific base 140.

In one embodiment, processor 112 may receive a monitoring system application directed to mobile baby monitoring. In such embodiment, processor 112 may be adapted (e.g., by performing the monitoring system application) to capture monitoring information including position data, such as a current position of modular camera 110 (e.g., from a GPS module, as described herein) and/or a series of positions of modular camera 110 and corresponding times, in order to record a route history, for example. In some embodiments, processor 112 may be adapted to correlate and/or store position data with other captured sensor data, for example, and the geographically correlated sensor data (e.g., image/video data, environmental data) may be provided to a database (e.g., stored on a server and/or a personal electronic device) in order to facilitate providing a relatively secure geo-tagged graphical interface to the sensor data. Access to a database of geographically correlated sensor data and/or a corresponding interface to the database may be provided as a value-added and/or pay-for service, such as one or more subscription location based services. In some embodiments, processor 112 may be adapted to encrypt or otherwise restrict user access to position data to provide additional privacy with respect to corresponding sensor data and/or to provide an incentive for users to subscribe to the location based services.

In related embodiments, processor 112 may be adapted to use position data, image data from imaging modules 114, 116, and/or other sensor data (e.g., orientation data from an orientation sensor/accelerometer) to determine a position of a particular baby imaged by modular camera 110. For example, processor 112 may perform various visible spectrum and/or infrared based recognition routines (e.g., facial, body type or size, clothing, heat signature recognition routines) to determine a presence and/or a position of a particular baby relative to modular camera 110. In some embodiments, processor 112 may be adapted to train the various recognition routines to recognize a particular baby, clothing, face, body, heat signature, or other personal characteristic by capturing sensor data known to be of the particular baby (e.g., as indicated by a user through manipulation of user interface 122, for example). In one embodiment, such training may be used to estimate a position of a particular baby relative to modular camera 110 using a variety of sensor data captured by monitoring system 100.

In a similar embodiment, processor 112 may be adapted to determine an outdoor time of modular camera 110 and/or a particular baby. For example, processor 112 may capture various environmental sensor data, such as a light meter value, a local temperature and/or humidity, a thermogram of the local environment, position data, and/or other environmental sensor data, and determine whether modular camera 110 and/or a particular baby is outdoors. In some embodiments, processor 112 may be adapted to access a local or network accessible mapping and/or weather database to facilitate such determination. Processor 112 may be adapted to accumulate time spent outdoors to provide an outdoor time measured over a period of a day, week, month, and/or other period of time.

In a further embodiment, processor 112 may be adapted to determine, for modular camera 110 and/or a particular baby, an entry into, an exit from, a proximity to, or a presence within or without a particular geographic zone. For example, processor 112 may be adapted to download and/or otherwise receive configuration data, including one or more geographic zones, from an external device, such as base 140, a server, and/or a personal electronic device. Once the geographic zones are specified, processor 112 may be adapted to capture monitoring information including a position of modular camera 110 and/or a particular baby, and then determine, from the monitoring information, an entry into, an exit from, a proximity to, or a presence within or without a specified geographic zone. Processor 112 may then generate a corresponding alarm based on the determination.

In some embodiments, configuration data associated with the specified geographic zone may specify what type of relative position aspect to monitor, a limit of the proximity, what type of alarm or alarms (e.g., increasing in severity as a proximity increases/decreases) to generate, and/or what devices receive the generated alarms, for example. In one embodiment, processor 112 may be adapted to provide a corresponding alarm to an interface of a remote monitoring system application, as described herein, based on the determination. Alarms may include text messages, push notifications, and/or telephone calls (e.g., generated by processor 112 in combination communication module 118), an audible beep and/or siren, a visible alarm such as a tinted and/or white strobe flash, and/or other types of remote and/or local alarms. In some embodiments, a remote alarm may include corresponding sensor data, such as image, sound, and/or position data captured by monitoring system 100.

Specified geographic zones may be defined by a geographic area and/or a period of time. For example, a particular geographic zone may correspond to a day-care location, and an alarm may be generated if camera 110 and/or a particular baby exits the geographic zone during a selected period of time corresponding to a planned drop-off and pick-up. In some embodiments, the geographic zones may be user-specified, and may correspond to areas known to the user to be safe, harmful, or otherwise particularized with respect to a particular baby. In other embodiments, the geographic zones may be manufacturer-specified as areas known to be harmful and/or unsafe with respect to babies generally, such as a pollution source, a body of water, a large elevation change, and/or high vehicle traffic areas, for example. In some embodiments, a database of such areas known to be harmful and/or unsafe with respect to babies generally may be maintained as a pay-for service coupled to a particular monitoring system application and/or application-specific base.

In a related embodiment, the one or more geographic zones may correspond to a start position, a planned route, and/or a destination associated with a planned trip (e.g., for a monitored baby, person, vehicle, and/or pet). Processor 112 may be adapted to determine an exit (e.g., a departure) from a start position, for example, generate a corresponding alarm, and, in some embodiments, provide the alarm to an interface of a remote monitoring system application. Likewise, processor 112 may be adapted to determine an exit (e.g., a departure) from a planned route, for example, generate a corresponding alarm, and provide the alarm to an interface of a remote monitoring system application. Processor 112 may also be adapted to determine an entry into (e.g., an arrival to) a destination, for example, to generate a corresponding alarm, and to provide the alarm to an interface of a remote monitoring system application. Thus, monitoring system 100 may be adapted to provide an alarm, text, telephone call, or other indication of an arrival of a monitored person or object to a user-specified destination, for example, and/or to indicate a departure from a start position, a planned departure time from a start position (e.g., correlating the start position with a particular time period, as described herein), a planned route and/or timed milestones along the planned route, and/or a planned arrival time at a destination. In one embodiment, an alarm may include a remote request for communication, as described herein.

In additional embodiments, processor 112 may be adapted to receive a location of an external device, such as a personal electronic device, that includes an interface for a remote monitoring system application, as described herein. For example, processor 112 may be adapted to establish a communication link directly with the interface (e.g., using communication module 118, periodically, or upon broadcast request by the interface. In various embodiments, processor 112 may determine, from monitoring information including position data for modular camera 110 and/or a particular baby monitored by modular camera 110, routing from the location of the external device to modular camera 110 and/or the baby. Routing may correspond to one or more of driving, walking, and/or public transit routing, for example, depending on a user-supplied configuration setting and/or an environment of modular camera 110. Upon determining the routing, processor 112 may be adapted to provide the routing to the external device, for example, using communication module 118. Processor 112 may also be adapted to update the routing periodically to compensate for changes in the position of modular camera 110 and/or the baby, and/or a current location of the external device as it nears the end of the routing. In alternative embodiments, processor 112 may provide a current position of modular camera 110 and/or a particular baby to an external device, and the external device may determine the routing and/or provide the routing to a personal electronic device.

In further embodiments, processor 112 may be adapted to receive a remote communication request and then provide the remote communication request to a component of modular camera 110, to application-specific base 140, and/or to an external device, such as a personal electronic device, as described herein. For example, a remote communication request may be initiated locally by a user through manipulation of user interface 122 of camera 110 and/or user interface 152 of base 140. In one embodiment, user interface 152 may include a button marked with a symbol (e.g., a telephone) representing a remote communication. Upon manipulation of user interface 122 and/or 152, processor 112 may receive the corresponding communication request (e.g., signals and/or data from user interfaces 122 or 152, processor 142, and/or communication modules 118, 148). In another embodiment, a remote communication request may be initiated remotely, such as by a user of a personal electronic device including an interface of a remote monitoring system application. In one embodiment, the interface of the remote monitoring system application may include an icon and/or other selectable indicator that may be selected to transmit a remote communication request to processor 112 (e.g., facilitated by communication module 118 and/or 148).

Once processor 112 receives the remote communication request, processor 112 may then provide the request to a component of modular camera 110, to application-specific base 140, and/or to an external device, as appropriate. For example, processor 112 may be adapted to determine if the remote communication request is generated locally, and upon such determination, to transmit monitoring information and/or other data to the external device indicating the request. The monitoring information may include text, images, audible sounds, and/or other sensor data, for example, and may be transmitted as text messages, push notifications, a telephone call, and/or data over a communication link established directly with the external device and/or indirectly through a server acting as an intermediary. In one embodiment, the transmitted request may include configuration settings for an interface of a remote monitoring system application causing the interface to generate an alarm or other type of indication that processor 112 has received a remote communication request.

If, alternatively, processor 112 determines that the remote communication request is generated remotely, processor 112 may be adapted to provide the request to an alarm, indicator, or other component of modular camera 110, and/or to base 140 (e.g., and to one or more components of base 140), thereby causing the component to notify a local user that processor 112 has received a remote communication request. In various embodiments, processor 112 may be adapted to establish a video and/or audio communication link with an external device and/or an interface of a remote monitoring system application, using communication modules 118 and/or 148, after providing the remote communication request to the appropriate device or devices. In one such embodiment, the communication link may include a telephone call between the external device and modular camera 110 and/or application-specific base 140.

Although the above discusses various processes in the context of baby monitoring, similar processes may be used in a variety of other contexts, including mobile elderly monitoring, vehicular monitoring, pet monitoring, home security/automation monitoring, industrial safety monitoring, and other types of monitoring. For example, processor 112 may be adapted to use imaging module 114 and/or 116 and/or other sensor data, and recognition routines similar to those described above, to detect presence of a particular elderly person or vehicle, an open or closed security entrance, a water leak, a gas leak, and/or other objects and/or safety hazards. Similar location-based services may also be provided, adjusted to address concerns particular to the type of monitoring associated with application-specific base 140. For example, in the context of industrial safety monitoring, processor 112 may be adapted to determine a current position and/or successive positions of one or more objects imaged by camera 110 and generate an alarm based on a proximity of the objects to various geographical zones.

In addition to the above, processor 112 may be adapted to perform a variety of image processing operations to facilitate a particular type of monitoring. Such image processing operations may be selectively provided in one or more monitoring system applications downloaded by modular camera 110 in response to interfacing with application-specific base 140, as described herein. In particular, such image processing routines may be adapted to determine various characteristics of scene 102 and/or 104 from infrared image data captured by imaging modules 114 and/or 116, for example, and/or from infrared image data combined with visible spectrum image data.

For example, in the context of baby (and/or elderly, vehicle, or pet) monitoring, processor 112 may be adapted to process infrared image data and/or combined image data to determine a breathing rate of a baby, track an oronasal region of a baby (e.g., relative to potential breathing obstructions), monitor a body temperature of a baby, monitor a posture of a baby, detect ambient temperatures near a baby, and other characteristics of a baby and its environment. These and other related infrared image processing techniques related to baby monitoring are described in U.S. Provisional Patent App. No. 61/670,824, filed Jul. 12, 2012 and entitled "INFANT MONITORING SYSTEMS AND METHODS USING THERMAL IMAGING", which is hereby incorporated by reference in its entirety.

In the context of home safety/automation monitoring and/or industrial safety monitoring, processor 112 may be adapted to process infrared image data and/or combined image data to detect an intruder or person, an appliance in use, a fire, a particular gas, a variety of types of chemicals, a power usage, a hazardous condition, an energy efficiency, and or other characteristics of at least a portion of a home or industrial structure and the surrounding environment. These and other related infrared image processing techniques and/or related control operations are described in U.S. Provisional Patent App. No. 61/651,976, filed May 25, 2012 and entitled "MONITOR AND CONTROL SYSTEMS AND METHODS FOR OCCUPANT SAFETY AND ENERGY EFFICIENCY OF STRUCTURES", and in U.S. Provisional Patent App. No. 61/445,280, filed Feb. 22, 2011 and entitled "INFRARED SENSOR SYSTEMS AND METHODS", which are hereby incorporated by reference in their entirety.

In the context of combined visible spectrum and infrared image processing, processor 112 may be adapted to superimpose, fuse, or otherwise combine infrared image data with visible spectrum image data to generate user-viewable images having a higher definition and/or clarity. For example, processor 112 may be adapted to perform a resolution and contrast enhancing fusion operation disclosed in U.S. patent application Ser. No. 13/105,765, filed May 11, 2011, which is hereby incorporated by reference in its entirety. Additional related infrared image processing techniques are described in U.S. Provisional Patent App. No. 61/793,952, filed Mar. 15, 2013 and entitled "INFRARED IMAGING ENHANCEMENT WITH FUSION", which is hereby incorporated by reference in its entirety.

For example, in some embodiments, processor 112 may be adapted to capture visible spectrum image data (e.g., using imaging module 114) while scene 102 and/or 104 is illuminated with visible spectrum light, and then combine that data with infrared image data captured (e.g., using imaging module 116) at a different time to produce user-viewable images with increased contrast and/or visible color detail otherwise unavailable from the infrared image data alone. In some embodiments, the infrared image data may be captured when scene 102 and/or 104 are not illuminated or otherwise obscured in the visible spectrum.

More generally, processor 112 may be configured to receive visible spectrum and infrared (e.g., thermal) images of at least a portion of scene 102 and/or 104 captured by imaging modules 114, 115, perform various image processing operations (e.g., non-uniform and/or other types of noise reduction, calibration, scaling, decomposition, video compression, and/or other image processing), and generate combined images from the captured images to, for example, provide high resolution, high contrast, or targeted contrast combined images of portions of and/or objects in scene 102 and/or 104. Processor 112 may also be configured to compile, analyze, or otherwise process visible spectrum images, infrared images, and context data (e.g., time, date, environmental conditions) to generate monitoring information about scene 102 and/or 104, such as monitoring information about detected objects in scene 102 and/or 104.

For example, processor 112 may determine, from combined images including radiometric data from calibrated infrared images, aggregate temperature of an object or portion of an object. Processor 112 may generate monitoring information that includes, for example, a temperature reading based on the determined temperatures. Processor 112 may further determine whether the temperature of an object is within a typical operating temperature range (e.g., as set by one or more configuration settings, or as determined through monitoring over a period of time), and generate monitoring information that includes a notification or alarm indicating the temperature is outside a typical range.

In another example, processor 112 may perform various image processing operations and image analytics on visible spectrum, infrared, and/or combined images of an object to obtain temperature distribution and variance profiles of the object. Processor 112 may correlate and/or match the obtained profiles to those of abnormal conditions to detect, for example, a water leak, an abundance of a type of gas, or other conditions.

In yet another example, processor 112 may perform various image processing operations and image analytics on visible spectrum, infrared, and/or combined images of scene 102 and/or 104 to detect transitory objects entering scene 102 and/or 104. Based on the detection, processor 112 may generate monitoring information that includes an alarm or other visual or audible notifications that indicate arrival of a transitory object.

In some embodiments, processor 112 may be configured to convert visible spectrum, infrared, and/or combined images into user-viewable images (e.g., thermograms) using appropriate methods and algorithms. For example, thermographic data contained in infrared and/or combined images may be converted into gray-scaled or color-scaled pixels to construct images that can be viewed on a display and/or interface (e.g., an interface of a remote monitoring system application). Such conversion may include adjusting a dynamic range of one or more components of the combined images to match a dynamic range of a particular display or interface, for example, to emphasize a particular radiometric interval, and/or to increase a perceived contrast of user-viewable images. User-viewable images may optionally include a legend or scale that indicates the approximate temperature of a corresponding pixel color and/or intensity. Such user-viewable images, if presented on a display, may be used to confirm or better understand conditions of scene 102 and/or 104 detected by system 100. Monitoring information generated by processor 112 may include such user-viewable images.

Memory 113 may include one or more memory devices (e.g., memory components) to store data and information, including image data (e.g., including video data), audio data, and/or other types of sensor data, and/or other monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, monitoring information stored in memory 113 may be retrieved (e.g., by a remote monitoring system application) to provide a particular type of monitoring, as described herein. In another embodiment, memory 113 may include a portable memory device that can be removed from camera 110 and used to convey stored data to other systems, including monitoring systems and/or personal electronic devices, for further processing and inspection. In some embodiments, processor 112 may be configured to execute software instructions stored on memory 113 to perform various methods, processes, or operations in the manner described herein.

As shown in FIG. 1, modular camera 110 may include imaging module 114 and/or optional imaging module 116. One or both of imaging modules 114, 116 may be implemented as any type of visible spectrum camera or imaging device capable of imaging at least a portion of scene 102 and/or 104 in the visible spectrum. In some embodiments, imaging modules 114, 116 may be a small form factor visible spectrum camera or imaging device, and may include one or more logic devices to process and/or store images, as described herein. For example, in some embodiments, imaging modules 114, 116 may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other sensors. Imaging modules 114, 116 may include a focal plane array (FPA) of visible spectrum sensors, for example, and may be configured to capture, process, and/or manage visible spectrum images of scene 102 and/or 104. Imaging modules 114, 116 may be configured to store and/or transmit captured visible spectrum images according to a variety of different color spaces/formats, such as YCbCr, RGB, and YUV, for example, and individual visible spectrum images may be color corrected and/or calibrated according to their designated color space and/or particular characteristics of imaging modules 114, 116.

In other embodiments, one or both of imaging modules 114, 116 may be implemented as a small form factor infrared camera or imaging device, for example, which may be implemented as an array of microbolometers in accordance with various embodiments disclosed in U.S. Provisional Patent App. No. 61/793,952, incorporated by reference above, or otherwise where appropriate. Imaging modules 114, 116 may include one or more logic devices to process and/or store images, as described herein, and be configured to capture, process, and/or manage infrared images, including thermal images, of at least portions of scene 102 and/or 104. Imaging modules 114, 116 may be configured to store and/or transmit captured infrared images according to a variety of different color spaces/formats, such as YCbCr, RGB, and YUV, for example, where radiometric data may be encoded into one or more components of a specified color space/format.

In some embodiments, a common color space may be used for storing and/or transmitting infrared images and visible spectrum images. Imaging modules 114, 116 may be mounted so that they share at least a portion of their fields of view, for example, or so that they image different and/or opposing fields of view, as shown in FIG. 1. Imaging modules 114, 116 may or may not exhibit the same intrinsic resolutions.

In various embodiments, imaging modules 114, 116 may include respective optical elements 115, 117 (e.g., visible spectrum and/or infrared transmissive lenses, prisms, reflective mirrors, fiber optics) that guide visible spectrum and/or infrared radiation from scenes 102 and/or 104 to sensors (e.g., FPAs) of imaging modules 114, 116. Such optical elements may be used when mounting an imaging module at a particular FOV-defined location with respect to camera housing 111 is otherwise difficult or impossible. For example, a flexible fiber-optic cable may be used to route visible spectrum and/or infrared radiation to an imaging module so as to reduce parallax error between multiple imaging modules. Such optical elements may also be used to suitably define or alter an FOV of an imaging module. A switchable FOV (e.g., selectable by a corresponding imaging module and or processor 112) may optionally be provided to provide alternating far-away and close-up views of a portion of scene 102 and/or 104, for example, or to provide focused and de-focused views of scene 102 and/or 104.

In some embodiments, one or more of imaging modules 114, 116 and/or optical elements 115, 117 may include actuators to provide pan, tilt, and/or zoom operations to adjust a direction and/or width of a FOV of the imaging modules 114, 116. For example, in some embodiments, one or both of imaging modules 114, 116 may be pan-tilt-zoom (PTZ) cameras that may be controlled, for example, by processor 112 and/or various external devices. In other embodiments, the imaging modules may be implemented to share a single selectable set of optical elements (e.g., with selectable visible spectrum and infrared optical elements, depending on a type of image being captured), for example, so that the imaging modules have the same field of view and the same optical axis. In such embodiments, FOV and/or parallax correction operations (e.g., scaling, registering, warping) may not be performed.

Infrared images captured, processed, and otherwise managed by imaging modules 114 and/or 116 may be radiometrically normalized infrared images (e.g., thermal images). Pixels that make up a captured image may contain calibrated thermal data (e.g., absolute temperatures). In embodiments where one or more of imaging modules 114, 116 are implemented as an infrared imaging module, the infrared imaging module and/or associated components may be calibrated using appropriate techniques so that images captured by the infrared imaging module are properly calibrated infrared images. In some embodiments, appropriate calibration processes may be performed periodically by the infrared imaging module and/or processor 112 so that the infrared imaging module and its captured infrared images maintain accurate calibration. In other embodiments, the infrared imaging module and/or processor 112 may be configured to perform other processes to emphasize a desired range or interval of radiometric data, for example, and allocate a dynamic range of one or more components of a resulting infrared image according to the desired range of radiometric data. Thus, a radiometric component of an infrared image may include calibrated radiometric data, un-calibrated radiometric data, and/or adjusted radiometric data.

Communication module 118 may be configured to facilitate communication and interfacing between various components of system 100 (e.g., interface 130 between camera 110 and base 140), and/or various networked devices, such as a wireless access point, a personal electronic device, and/or a server. For example, components such as imaging modules 114, 116, and/or other components 124 may transmit and receive data to and from processor 112 through communication module 118, which may manage wired and/or wireless communication links between the various components.

In some embodiments, communication module 118 may be configured to allow components of system 100 to communicate and interface with other components of a monitoring system monitoring scenes 102, 104. For example, processor 112 may communicate, via communication module 118, with a motion detector, smoke detector, and other existing sensors and electronic components. In this regard, communication module 118 may support various interfaces, protocols, and standards for monitoring system networking, such as the controller area network (CAN) bus, the local interconnect network (LIN) bus, the media oriented systems transport (MOST) network, or the ISO 11738 (or ISO bus) standard.

In other embodiments, camera 110 may include a number of communication modules 118 adapted for various applications of camera 110 with respect to various types of monitoring. In other embodiments, communication module 118 may be integrated into or implemented as part of various other components of camera 110. For example, imaging modules 114, 116, and processor 112 may each comprise a subcomponent that may be configured to perform the operations of communication module 118, and may communicate with one another via wired and/or wireless connections without a separate communication module 118.

Communication module 118 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), mobile cellular component, a wireless satellite component, or other appropriate wireless communication components. Communication module 118 may also be configured for a proprietary wireless communication protocol and interface based on radio frequency (RF), microwave frequency (MWF), infrared frequency (IRF), and/or other appropriate wireless transmission technologies. Communication module 118 may include an antenna coupled thereto for wireless communication purposes. Thus, in one example, communication module 118 may handle, manage, or otherwise facilitate wireless communication by establishing wireless communication links to a wireless router, hub, or other appropriate wireless devices.

Communication module 118 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces (e.g., interface 130, in embodiments where interface 130 is implemented, at least in part, as a physical interface) may also be supported by communication module 118. Communication module 118 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Power source 120 may be implemented as a battery, a power adapter, a charging circuit, a power interface, a power monitor, and/or other type of power supply providing a fixed and/or mobile power source. In some embodiments, power source 120 may be adapted to provide an uninterruptible power source and/or power conditioning to protect operation of modular camera 110.

User interface 122 may be implemented as one or more buttons, indicators (e.g., LEDs), keyboards, trackballs, knobs, joysticks, displays (e.g., a liquid crystal display, a touch-screen display), and/or other type of user interface adapted to accept user input and/or provide user feedback. In one embodiment, user interface 122 may include a power button, an LED to indicate a remote communication request, and/or a button to request a remote communication. In various embodiments, user interface 122 may be used to input a variety of configuration settings, as described herein. In some embodiments, user interface 122 may be used to view one or more images and/or other sensor data captured by system 100 and/or processed according to the various operations described herein.

Other components 124 may include, in some embodiments, other environmental sensors such as a temperature sensor (e.g., a thermocouple, an infrared thermometer), a moisture sensor, a humidity sensor, an electrical sensor (e.g., a volt/current/resistance meter), a pressure sensor (e.g., a barometer), a microphone, an external motion sensor, an accelerometer, a visible spectrum light meter, and/or any of the variety of components provided in FIG. 2. Sensor data from sensors such as a temperature, moisture, pressure, or light sensor may be utilized by processor 112 to detect and potentially compensate for environmental conditions (e.g., fog, smoke, or other low-light conditions), and thereby obtain more accurate or more easily interpretable monitoring information.

As shown in FIG. 1, embodiments of application-specific base 140 may include a number of components and/or modules similar to the components of modular camera 110. For example, base housing 111, processor 142, memory 143, optional imaging modules 144 and 146 and corresponding optical elements 145 and 147, power source 150, user interface 152, and communication module 148 of application-specific base 140 may each function and be implemented similarly to camera housing 111, processor 112, memory 113, imaging modules 114 and 116 and corresponding optical elements 115 and 117, power source 120, user interface 122, and communication module 118 of modular camera 110, respectively, as described herein. However, each component of application-specific base 140 may be selected to supplement features offered by embodiments of modular camera 110, or provide features not offered by embodiments of modular camera 110, to facilitate a particular type of monitoring.

For example, in one embodiment, modular camera may include only a single visible spectrum imaging module (e.g., imaging module 114). In the context of baby monitoring, an embodiment of application-specific base 140 may include, for example, an infrared imaging module (e.g., optional imaging module 144) and/or a rear facing visible spectrum imaging module (e.g., optional imaging module 146). In such embodiment, the imaging module 144 may be disposed to share a FOV with imaging module 114 and enable one or more of the infrared imaging/combined imaging enhanced baby monitoring operations described herein. Further, imaging module 146 may be disposed to monitor an environment and/or caretaker of a baby while imaging module 114 monitors the baby. Likewise, power source 150 may be implemented with a larger capacity than power source 120 so as to increase a mobility of monitoring system 100, for example, and/or may be implemented to provide a power interface to mains power to charge or otherwise power both application-specific base 140 and modular camera 110 (e.g., over interface 130).

For another example, some embodiments of modular camera 110 may include a communication module 118 implemented without a cellular modem or other type of relatively long range wireless networking capability. In such embodiments, communication module 148 of application-specific base 140 may be implemented with such capability to facilitate long range mobility and/or remote monitoring, as in the context of mobile baby, elderly, vehicular, and/or pet monitoring. Similarly, where modular camera 110 does not include a GPS or a high-resolution type of position sensor, application-specific base 140 may be implemented with a position sensor, for example, and/or a position sensor with an increased resolution over a position sensor of modular camera 110, where position data and/or location based services facilitate a particular type of monitoring.

In the context of baby, elderly, vehicular, and/or pet monitoring, application-specific base 140 may include additional components and/or features, such as a night light, a music player (e.g., to provide a lullaby), a temperature sensor, a humidity sensor, an accelerometer, and/or other components described herein, and user interface 152 may include easily accessible buttons and/or indicators to enable the night light and/or the music player, or to request/indicate a remote communication. In some embodiments, application-specific base 140 may include an image projector and/or other interfaces adapted to communicate directly with a baby, elderly person, pet, or user of a vehicle being monitored.

In the context of home safety/automation and/or industrial safety monitoring, application-specific base 140 may include other components and/or features, such as a particular sensor and/or type of sensor interface, a larger capacity memory, audible and/or visible alarms (e.g., a siren and/or strobe), illuminating LED arrays (e.g., infrared and/or visible spectrum), a pan/tilt actuator, or various other modules, including other components or modules described herein.

Base housing 141 may be adapted to facilitate a variety of different types of monitoring. For example, base housing 141 may include a rugged/sealed mounting and/or enclosure for modular camera 110, an articulated mount adapter for monitoring system 100 (e.g., for easy and/or secure attachment of monitoring system 100 to a stroller, walker, and/or other mobile structures), a pan/tilt adapter (e.g., to provide for actuated pan/tilt aiming of modular camera 110 and/or monitoring system 100), a wall mount adapter for monitoring system 100 (e.g., where monitoring system 100 is fixed), a suction cup mount adapter (e.g., to fix monitoring system to a window or dash of a vehicle), a lanyard mount (e.g., to secure monitoring system 100 to a necklace, or a collar for a pet), and/or other types of mount adapters facilitating mobile or fixed indoor and/or outdoor monitoring.

In addition to the above, processor 142 may be adapted to perform various operations to facilitate a particular type of monitoring, as described herein. For example, processor 142 may be adapted to perform any portion of the operations described above with respect to a monitoring system application and/or processor 112. In some embodiments, processor 142 may be adapted to establish a communication link with modular camera 110, using communication module 148 and various operations described herein, and upload a code indicating a location of a monitoring system application, the monitoring system application itself, configuration settings, various sensor data, and/or other monitoring information and/or applications (e.g., stored in memory 143) to modular camera 110 (e.g., to processor 112 and/or memory 113) over interface 130. In one embodiment, processor 142 may be adapted to receive similar data from modular camera 110, such as a remote communication request initiated at user interface 122 and/or an interface of a remote monitoring system application.

In various embodiments, processor 142 may be adapted to provide a remote monitoring system application to an external device, such as a personal electronic device, as described herein. For example, processor 142 may use communication module 148 to establish a communication link directly to a personal electronic device, or indirectly (e.g., through a server, modular camera 110, and or other external devices), and upload a code indicating a location of the remote monitoring system application, the remote monitoring system application itself, configuration settings, various sensor data, and/or other monitoring information and/or applications (e.g., stored in memory 143) to the external device. In some embodiments, base housing 141 may include a matrix barcode or other symbol (e.g., a quick response code), and an external device with an imaging module may sample the barcode or symbol to receive a location and/or access code for the remote monitoring system application. In other embodiments, processor 142 may be adapted to use user interface 152 (e.g., where user interface 152 includes a display) to display such barcode or symbol to a user momentarily.

FIG. 2 illustrates a block diagram of other components 124/154 for embodiments of monitoring system 100 of FIG. 1 in accordance with an embodiment of the disclosure. Each component of other components 124/154 may be integrated with modular camera 110, application-specific base, or both, and either device may access such components using one or more communication modules, as described herein. In various embodiments, a selection of other components 124/125 adapted to facilitate a particular type of monitoring, singularly or as a group, may be referred to as one or more application-specific components.

GPS 202 may be implemented as an interface to a global positioning satellite system, an interface to a cellular network based positioning system, and/or another type of module adapted to provide substantially real-time position data for monitoring system 100. Temperature sensor 204 may be implemented as a thermocouple, an infrared thermometer, and/or another device adapted to provide ambient and/or localized temperature data with respect to monitoring system 100. Humidity sensor 206 may be implemented as any device providing relative humidity and/or moisture data local to monitoring system 100, and may be used to determine whether monitoring system 100 is indoors or outdoors, to detect water leaks, to determine a health of a monitored subject, and/or other humidity and/or moisture related characteristics of a monitored area. External motion sensor 208 may be implemented as a pressure sensor and/or other device capable of detecting motion of an object near monitoring system 100, such as a person entering a room or hallway, for example. In some embodiments, external motion sensor 208 may be used as a barometer to measure weather characteristics over time.

Accelerometer 210 may be implemented as a gyroscope or other type of device capable of providing acceleration data and/or orientation data for monitoring system 100. Accelerometer 210 may be used to determine a speed of monitoring system 100 (e.g., as a feature of a mobile vehicular monitoring system) and absolute orientation of monitoring system 100 (e.g., to facilitate determining a position of an object imaged by monitoring system 100). In some embodiments, accelerometer 210 may be used to detect theft of monitoring system 100, for example, or to detect a fall of a person or object being monitored (e.g., such as when monitoring system 100 is attached to the monitored person or object).

Microphone module 212 may be implemented as a piezoelectric and/or other type of transducer adapted to provide audio data representing sounds local to monitoring system 100. Such audio data may be mono, stereo, or multi-channel, for example, and may be used to facilitate capture of audiovisual movies of a particular monitored environment or object. Speaker module 214 and/or audible alarm module 218 may be also be implemented as a piezoelectric and/or other type of transducer, but be adapted to receive audio data and produce audible sounds local to monitoring system 100. In some embodiments, audible alarm module 218 may be implemented as a relatively loud siren and/or other type of electronic transducer designed to be heard over long distances and/or to startle nearby animals or people. External audio adapter 216 may be implemented as one or more analog or digital interfaces to provide and/or receive audio data to/from external devices. In one embodiment, external audio adapter 216 may be a wireless interface implemented according to one or more of the various standards described herein. In various embodiments, one or more of microphone module 212, speaker module 214, and external audio adapter 216 may be used to implement two-way audio functionality for monitoring system 100 (e.g., to facilitate telephonic communication with an external device).

Visible alarm module 220 may be implemented as a tinted or white strobe light, one or more LEDs, and/or other types of lighting modules adapted to provide sufficient visible spectrum light to communicate the alarm over relatively large distances (e.g., as an emergency locator beacon, for example) or to startle nearby animals and/or people. Infrared/visible spectrum LED array 222 may be implemented with appropriate LEDs arranged to illuminate a monitored environment or object for imaging by one or more imaging modules of monitoring system 100. Monitoring system 100 may be adapted to power array 222 when there is insufficient illumination, for example, or to supplement existing illumination. In one embodiment, array 222 may be adapted to facilitate infrared-based night vision for monitoring system 100, where one or more of the imaging modules are predominately visible spectrum imaging modules but can be converted (e.g., through removal of one or more infrared filters of a corresponding optical element) to a pseudo infrared imaging module, or where one or more of the imaging modules are infrared imaging modules benefitting from artificial infrared illumination.

Night light module 224 may be implemented as one or more bulb, LED, vacuum tube, or other type low power lighting elements adapted to provide comforting light and/or sufficient light to move through a darkened room but allow for sleep. External memory adapter 226 may be implemented as a USB, SSD, and/or or other interface allowing access to a hard drive, a CD or DVD drive, a flash memory, and/or other type of external memory device. In some embodiments, external memory adapter 226 may be adapted to provide power to monitoring system 100 and/or to provide direct access to memories 113 and/or 143 by an external device.

Pan/tilt adapter 228 and pan/tilt actuator 230 may be implemented as one or more mechanical devices and/or interfaces providing manual and/or actuated pan/tilt capability for modular camera 110 and/or monitoring system 100. In some embodiments, monitoring system 100 may be adapted to receive configuration settings from an interface of a remote monitoring system application to actuate substantially real time pan and/or tilt motions. Lanyard adapter 232, wall mount adapter 234, and/or pan/tilt adapter, as described herein, may be implemented as a portion of base housing 141, for example, and may be adapted to secure monitoring system to a particular type of object (e.g., a necklace, a belt, a collar, a wall, and/or a fixed surface) to facilitate a particular type of monitoring. Other modules 236 may include other devices described herein, such as an image projector, other types of user interfaces, device interfaces (e.g., for various home automation devices and/or systems), sensors, actuators, mounts (e.g., a universal mount adapter with one or more articulated legs) and/or other devices.

Figure 3:
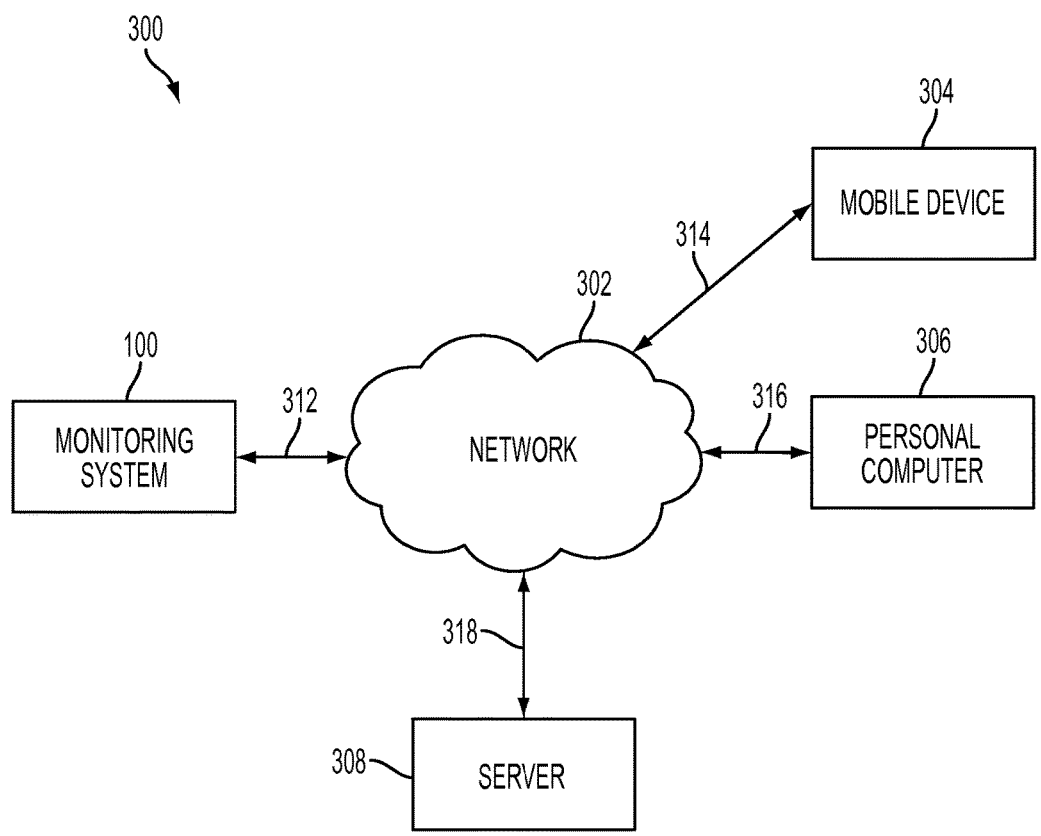
FIG. 3 illustrates a block diagram of a monitoring system in accordance with an embodiment of the disclosure.

FIG. 3 illustrates a block diagram of monitoring system 300 in accordance with an embodiment of the disclosure. As shown in FIG. 3, monitoring system 300 may be a distributed form of monitoring system 100, for example, including monitoring system 100 in communication with server 308 and various personal electronic devices, such as mobile device 304 and/or personal computer 306 over one or more communication links 312, 314, 316, 318 and/or network 302.

In one embodiment, mobile device 304 and/or personal computer 306 may be adapted to provide an interface of a remote monitoring system application, provided by monitoring system 100 and/or server 308, to one or more users of mobile device 304 and/or personal computer 306. Such interface may be adapted to provide user feedback, configuration settings, monitoring information, and/or other data graphically, such as on a display, and may be adapted to accept user input and/or configuration settings through use of a touch screen interface, a keyboard, a mouse, and/or other type of conventional user interface device, for example, as described herein. Mobile device 304 may be implemented as a mobile phone, smartphone, tablet computer, and/or other mobile personal electronic device. Personal computer 308 may be implemented as a desktop computer, a fixed terminal device, a network enabled television, a home entertainment center, and/or other relatively stationary personal electronic device.

In one embodiment, network 302 may represent a WAN, LAN, and/or other network and/or combination of networks, including the Internet, and monitoring system 100 may be adapted to establish communication links with the various personal electronic devices directly through network 302 and/or indirectly through server 308. In another embodiment, network 302 and the various enumerated communication links may represent an ad-hoc wireless and/or wired network, a proprietary network, and/or a mixed network, and monitoring system 100 may be adapted to establish a variety of types of communication links with the various devices of system 300.

In various embodiments, server 308 may be a host or other type of networked computer or distributed group of networked computers implemented as a value-added and/or pay-for service provider requiring registration and/or subscription before access is granted (e.g., before a communication link is allowed) to and/or among monitoring system 100, mobile device 304, and/or personal computer 306. Server 308 may be implemented as an intermediary between monitoring system 100 and the various personal electronic devices, for example, and may adapted to manage and/or store one or more user and/or device specific databases including the various types of monitoring information and/or other data described herein. In one embodiment, server 308 may be used to update a monitoring system application and/or a remote monitoring system application (e.g., stored on any of monitoring system 100, mobile device 304, and/or personal computer 306) with additional features and/or corrections, for example.

FIGS. 4-9 illustrate respective interfaces 400-900 for a monitoring system in accordance with various embodiments of the disclosure. For example, interfaces 400-900 may be implemented as part of a remote monitoring system application provided to mobile device 304 and/or personal computer 306 of monitoring system 300 in FIG. 3. In various embodiments, aspects of each interface 400-900 may be combined into a single interface and/or eliminated according a particular monitoring need, subscribed service, personal electronic device capability, and/or other selection of monitoring system configuration settings.

Figure 4:
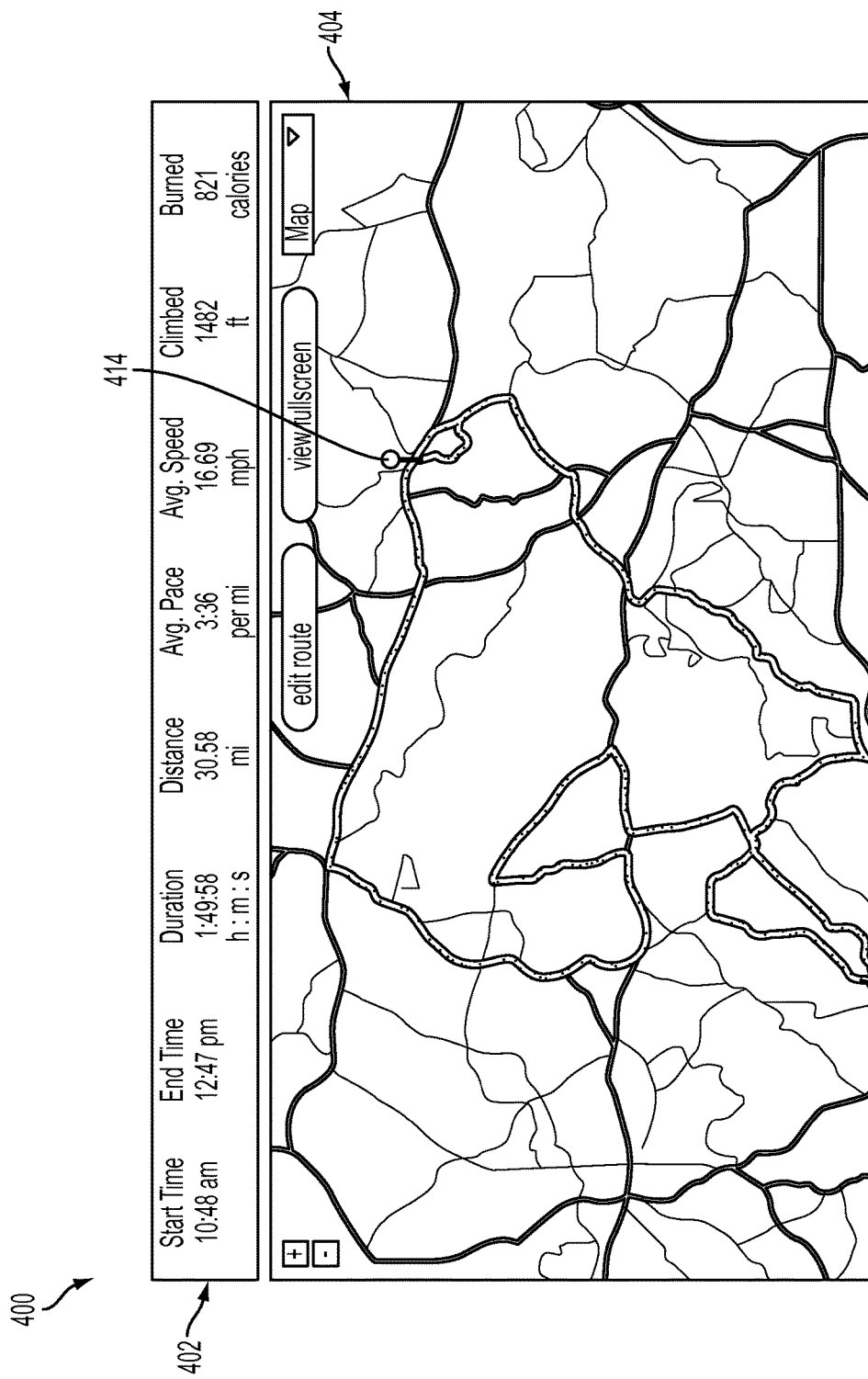
FIG. 4 illustrates an interface for a monitoring system in accordance with an embodiment of the disclosure.

As shown in FIG. 4, interface 400 includes textual portion 402, map portion 404, route 412, and current position 414. Textual portion 402 may be adapted to provide aspects of a route history, such as a transit time, start time and/or date, end time and/or date, distance, average speed or pace, change in elevation, aggregate elevation change, and other data determined from a route history. Route 412 may be adapted to provide similar data in graphical form on map portion 404. Current position 414 may be adapted to indicate a current position of monitoring system 100, modular camera 110, and/or a person or object monitored by monitoring system 100.

Figure 5:
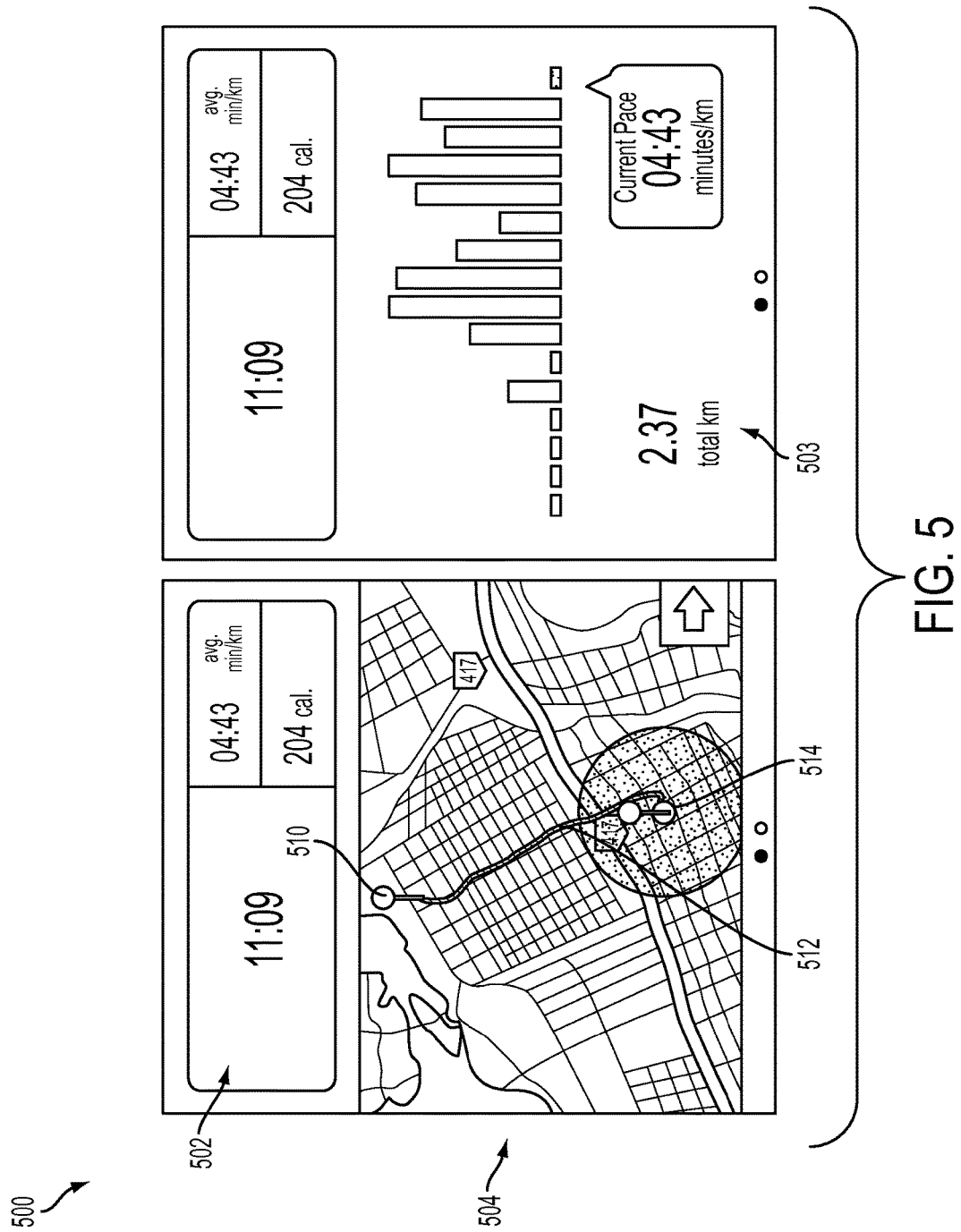
FIG. 5 illustrates an interface for a monitoring system in accordance with an embodiment of the disclosure.

As shown in FIG. 5, interface 500 includes textual portions 502 and 503, map portion 504, start position 510, route 512, and current position/destination 514. Textual portions 502 and 503 may be adapted to provide various actual and/or estimated aspects of route 512, such as a current time, an estimated and/or actual start time, transit time, end time, distance, average speed or pace, change in elevation, aggregate elevation change, and other data determined and or estimated from a route history and/or planned route. In addition, textual portions 502 and/or 503 may be adapted to provide an estimated or actual outdoor time associated with route 512. Route 512 may be adapted to provide similar data in graphical form on map portion 504. Additionally, in embodiments where route 512 is at least partially a planned route, route 512 may be adapted to change color, pulse, or otherwise effect an alarm if, during transit, a current position of a corresponding monitoring system, modular camera, and/or monitored person or object departs from route 512 and/or time specific milestones along route 512.

Likewise, start position 510 may be adapted to change color, pulse, or otherwise provide an alarm when monitoring system 100, modular camera 100, and/or a monitored person or object departs from start position 510 and/or a corresponding start time. Current position/destination 514 may be adapted to indicate a current position and/or change color, pulse, or otherwise provide an alarm when monitoring system 100, modular camera 110, and/or a monitored person or object arrives at destination 514, for example, or departs from a planned arrival time and/or a planned route. In one embodiment, textual portions 502 or 503 may supplement and/or effect such alarms by providing text messages, push notifications, or indicating incoming/outgoing calls from/to, for example, monitoring system 100.

Figure 6:
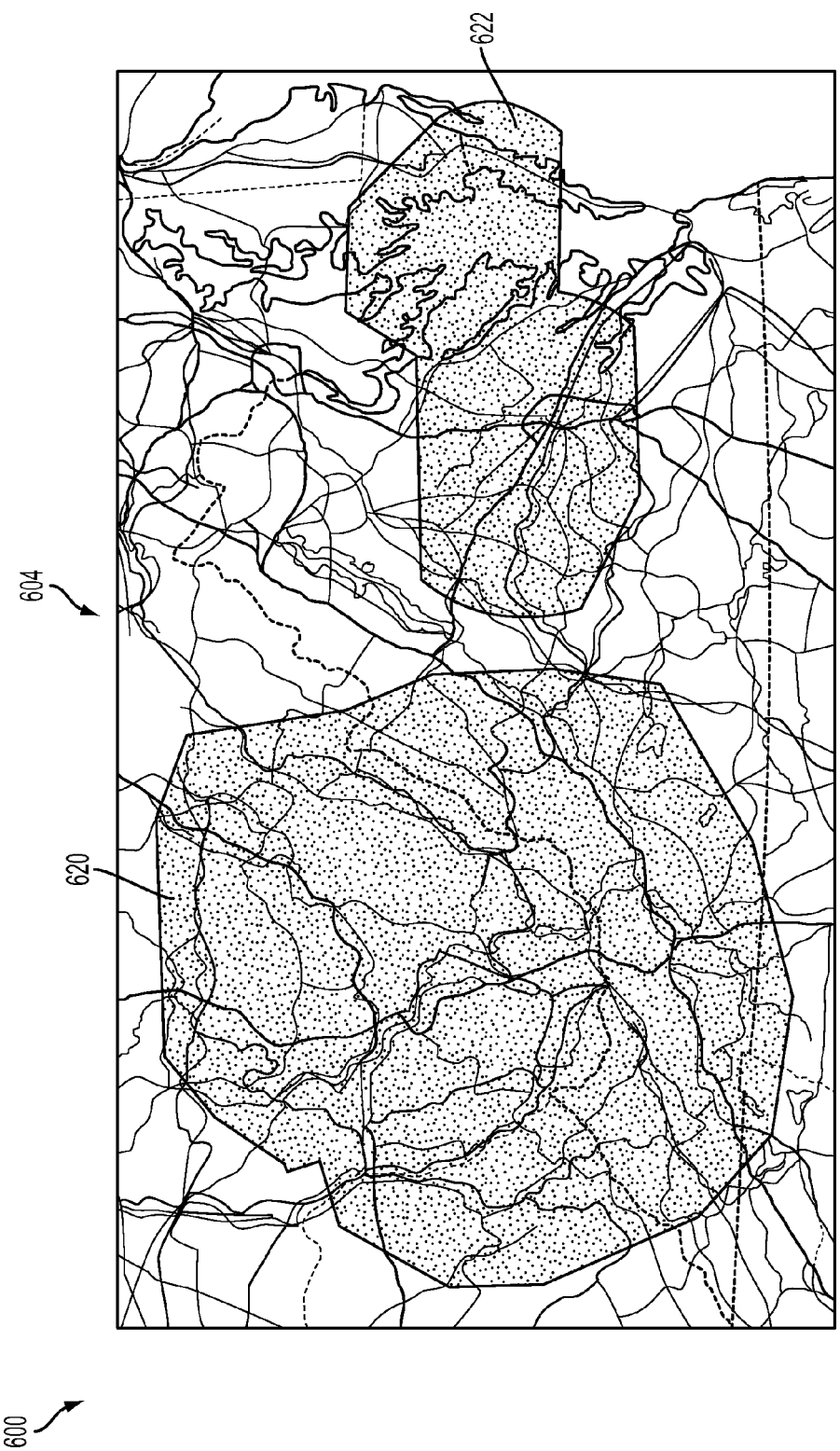
FIG. 6 illustrates an interface for a monitoring system in accordance with an embodiment of the disclosure.

As shown in FIG. 6, interface 600 includes map portion 604 and shaded graphical zones 620 and 622. Map portion may be adapted to provide a graphical interface allowing a user to review, define and/or otherwise select bounds for geographical zones 620 and/or 622, such as by windowing, dragging and dropping edges of a bounding box, and/or other manipulations facilitated by a mouse, joystick, keyboard, and/or other user interface devices commonly integrated with or coupled to a personal electronic device. In some embodiments, interface 600 may include a selection of icons or graphical controls allowing a user to select a time period and/or other configuration settings associated with each geographical zone. In one embodiment, such geographical zones may correspond to start position 510 and/or destination 514 in FIG. 5.

Figure 7:
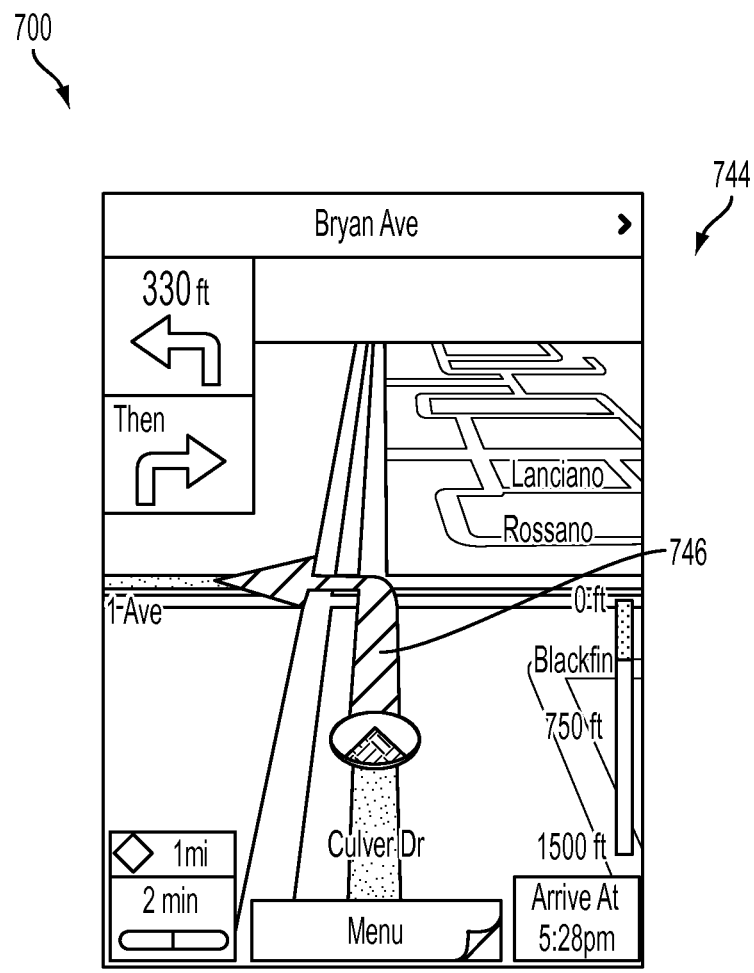
FIG. 7 illustrates an interface for a monitoring system in accordance with an embodiment of the disclosure.

As shown in FIG. 7, interface 700 includes map portion 744 displaying a current position of a personal electronic device and route 746 to monitoring system 100 and/or a monitored person or object. In some embodiments, map portion 744 may include legends and/or other descriptive information, as shown, allowing a user to follow route 746 reliably and/or safely. As noted herein, route 746 may correspond to a driving, walking, and/or public transit route, and interface 700 may be adapted to update route 744 based on an updated position for monitoring system 100, modular camera 100, a monitored person or object, and/or for a personal electronic device performing a corresponding remote monitoring system application.

Figure 8:
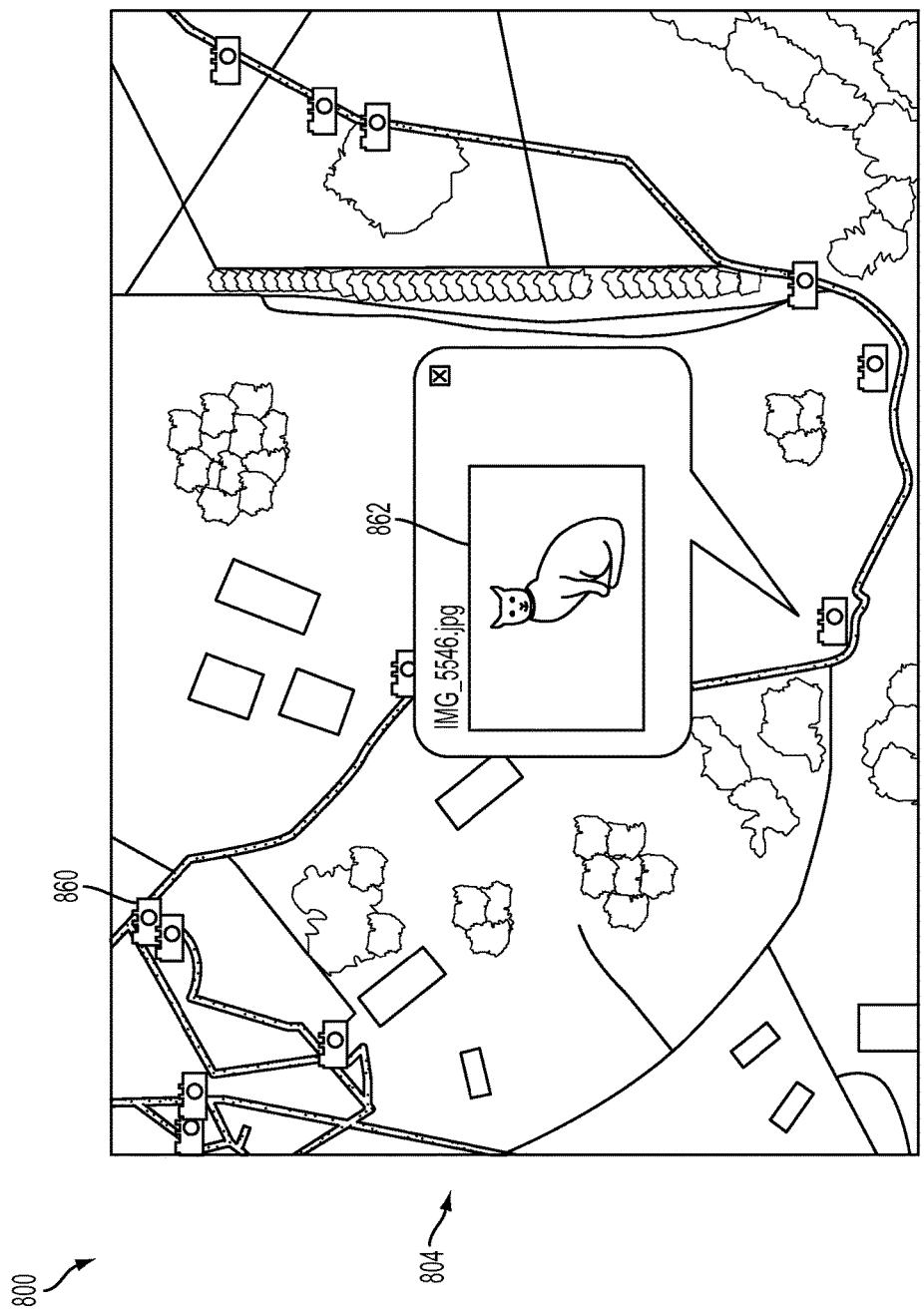
FIG. 8 illustrates an interface for a monitoring system in accordance with an embodiment of the disclosure.

As shown in FIG. 8, interface 800 includes map portion 804 and various geo-tag icons 860 indicating sensor data captured at a particular geographical location, such as image/video 862. In some embodiments, geo-tag icons 860 and corresponding sensor data may be stored in a database in server 308, for example, that is separate from both monitoring system 100 and mobile device 304 and personal computer 306. In such embodiments, a remote monitoring system application corresponding to interface 800 may be adapted to download such sensor data directly from server 308. In other embodiments, geo-tag icons 860 and corresponding sensor data may be stored in monitoring system 100 and be access directly from monitoring system 100.

Figure 9:
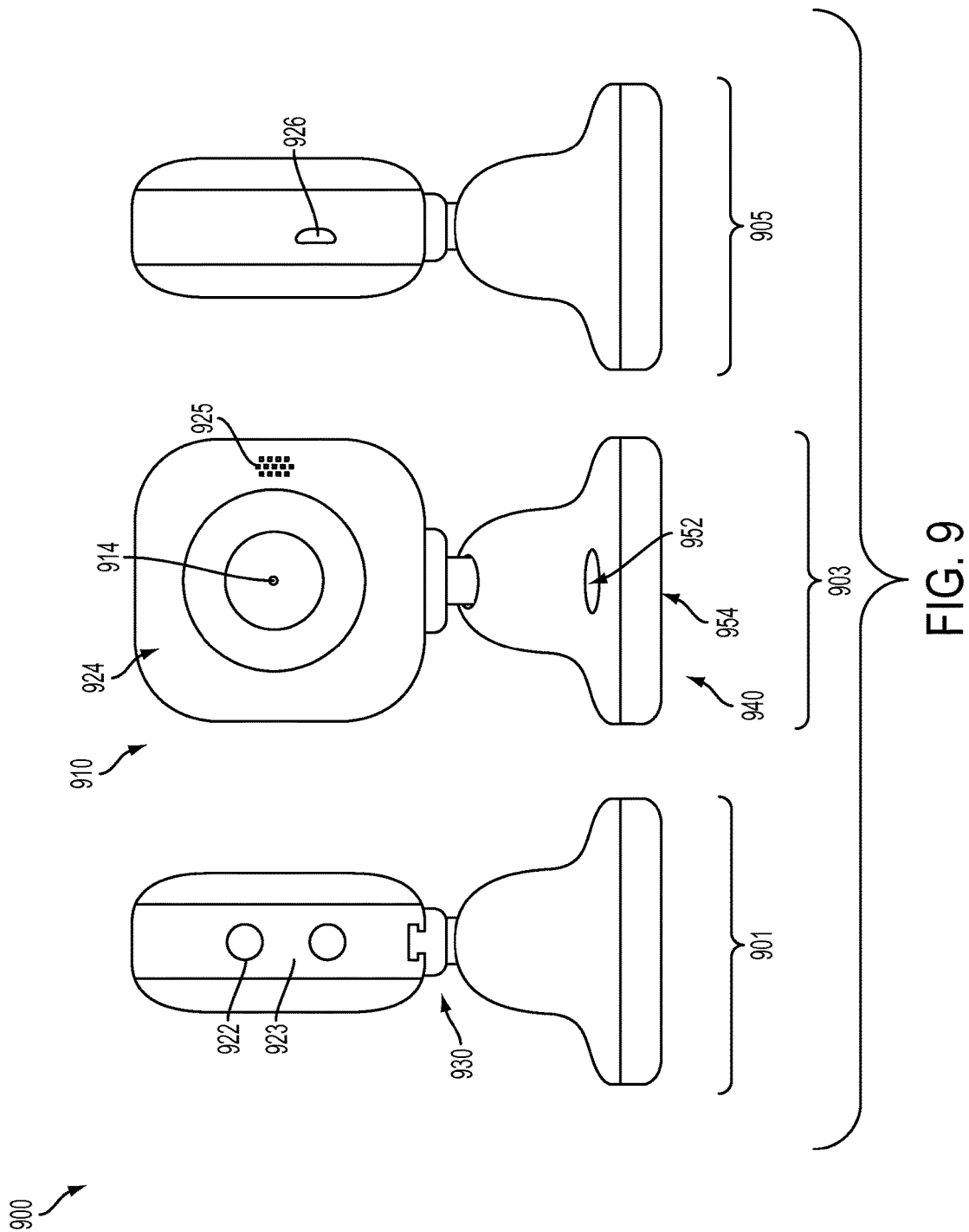
FIG. 9 illustrates views of a monitoring system in accordance with an embodiment of the disclosure.

FIG. 9 illustrates multiple views 901, 903, 905 of a monitoring system 900 in accordance with an embodiment of the disclosure. As shown in FIG. 9, monitoring system 900 includes modular camera 910 interfaced with application-specific base 940 using physical mount interface 930. View 901 shows that interface 930 is adapted to slide into and secure modular camera 910 to application-specific base 940, in addition to providing a wired communication link and/or power delivery interface between modular camera 910 and application-specific base 940. View 901 also shows button 922 and indicator 923 implementing a portion of a user interface for modular camera 910. View 903 shows imaging module 914, light meter 924, and microphone/speaker module 925 of modular camera 910. View 903 also shows button/indicator 952 and bottom surface 954 of application-specific base 940. In some embodiments, button/indicator 952 may correspond to a night light and night light selector, for example, or a remote communication request selector/indicator. In various embodiments, bottom surface 954 may correspond to a wall mount adapter, for example, or a suction mount adapter, as described herein. View 905 shows external memory adapter 926. In one embodiment, adapter 926 may correspond to a mini-USB adapter, for example, or a mini-HDMI adapter.

Figure 10:
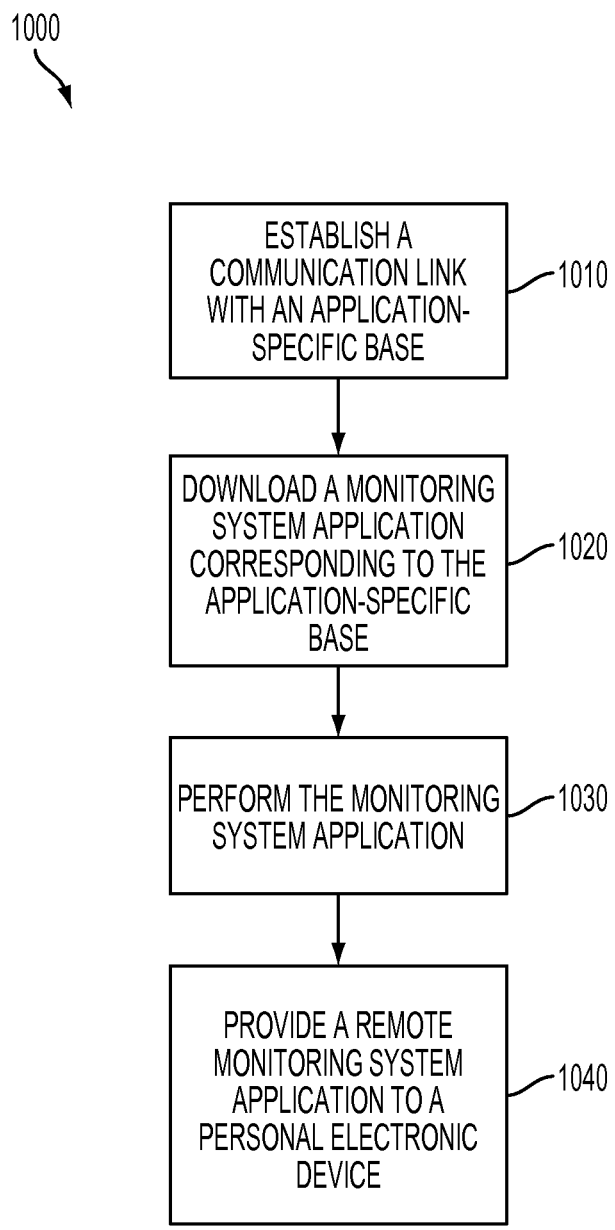
FIG. 10 illustrates a flow diagram of various operations to provide monitoring by a monitoring system in accordance with an embodiment of the disclosure.

FIG. 10 illustrates a flow diagram of process 1000 to provide monitoring in accordance with an embodiment of the disclosure. In some embodiments, the operations of FIG. 10 may be implemented as software instructions executed by one or more processors and/or logic devices used to implement a monitoring system. More generally, the operations of FIG. 10 may be implemented with any combination of software instructions, electronic hardware (e.g., inductors, capacitors, amplifiers, or other analog and/or digital components), and/or mechanical hardware used with a monitoring system. It should be appreciated that any step, sub-step, sub-process, or block of process 1000 may be performed in an order or arrangement different from the embodiment illustrated by FIG. 10. Further, in some embodiments, any number of processes similar to process 1000 may be performed substantially simultaneously to produce multiple instances of monitoring throughout a distributed monitoring system, for example. Although process 1000 is described with reference to systems 100 and 300, process 1000 may be performed according to systems different from system 100 and including a different selection and/or number of modules and/or components.

In block 1010, a monitoring process includes establishing a communication link with an application-specific base. For example, in one embodiment, processor 112 of modular camera 110 may be adapted to use communication module 118 to establish a communication link with application-specific base 140 over interface 130. In some embodiments, the communication link may be implemented as a wired communication link and require physical interfacing of modular camera with application-specific base 140, for example. In other embodiments, the communication link may be implemented as one or more wireless communication links and require only momentary proximity of modular camera to application-specific base 140. In various embodiments, block 1010 may be performed substantially simultaneously with process steps used to establish other communication links, for example.

In block 1020, a monitoring process includes downloading a monitoring system application corresponding to the application-specific base. For example, in one embodiment, processor 112 may be adapted to use communication module 118 to download a monitoring system application from application-specific base 140 and/or server 308. In some embodiments, processor 112 may download a code from application-specific base 140 that indicates a location (e.g., server 308) of the monitoring system application, and then establish an appropriate communication link and download the monitoring system application from the location. In other embodiments, processor 112 may download the monitoring system application directly from application-specific base 140. In various embodiments, block 1020 may be performed substantially simultaneously with process steps used to download or otherwise receive data from various components or devices separate from processor 112 and/or modular camera 110, for example.

In block 1030, a monitoring process includes performing the monitoring system application. For example, in one embodiment, processor 112 may be adapted to execute one or more operations described herein to perform the monitoring system application. In one embodiment, processor 112 may capture image data and various other types of sensor data, including position data, to facilitate a variety of location based services, as described herein. In other embodiments, processor 112 may capture visible spectrum image data and infrared image data and form combined image data, as described herein. In various embodiments, the monitoring system application may be directed a particular type of monitoring, such as mobile and/or fixed baby, elderly person, vehicular, and/or pet monitoring, home safety/automation monitoring, industrial safety monitoring, and/or other types of monitoring, as generally described herein.

In block 1040, a monitoring process includes providing a remote monitoring system application to a personal electronic device. For example, in one embodiment, processor 112 and/or processor 142 may be adapted to use communication module 118 and/or 148 to provide a remote monitoring system application to mobile device 304. In one embodiment, processor 112 may receive the remote monitoring system application from application-specific base 140 and then provide the remote monitoring system application to mobile device 304 over communication links 312-314 and network 302. In another embodiment, processor 112 and/or 142 may provide a code indicating a location (e.g., server 308) of the remote monitoring system application to mobile device 304, and mobile device 304 may download the remote monitoring system application from the location. Upon downloading the remote monitoring system application, mobile device 304 may perform the remote monitoring system application to provide a corresponding interface to a user of mobile device 304, where the interface allows the user to review, select and/or otherwise manipulate monitoring information, configuration settings, and/or other data of monitoring system 100.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A monitoring system comprising:
a modular camera adapted to interface with an application-specific base, wherein the modular camera comprises an imaging module, a communication module, a memory, and a processor in communication with the imaging and communication modules and the memory, and wherein the processor is adapted to:
establish a communication link with the application-specific base;
download a monitoring system application corresponding to the application-specific base from the application-specific base to the modular camera, the monitoring system application comprising machine executable software instructions, the monitoring system application is downloaded from the application-specific base to the modular camera when the modular camera is physically mounted to the application-specific base; and
perform the monitoring system application by executing the software instructions to capture monitoring information, wherein the monitoring information comprises image data captured by the imaging module according to the monitoring system application.

2. The monitoring system of claim 1, wherein:
the modular camera comprises a GPS; and
the processor is adapted to capture monitoring information comprising a current position of the modular camera and/or a series of positions of the modular camera and corresponding times.

3. The monitoring system of claim 1, wherein:
the modular camera comprises a microphone module; and
the processor is adapted to capture monitoring information comprising audible sounds sensed by the microphone module according to the monitoring system application.

4. The monitoring system of claim 1, wherein:
the imaging module comprises a first imaging module;
the modular camera comprises a second imaging module disposed opposite the first imaging module; and
the processor is adapted to capture monitoring information comprising image data captured by the second imaging module according to the monitoring system application.

5. The monitoring system of claim 1, further comprising the application-specific base,
wherein the application-specific base is adapted to provide a remote monitoring system application, corresponding to the application specific base, to a personal electronic device;
wherein the remote monitoring system application comprises an interface adapted to provide remote access to the monitoring information; and wherein the modular camera is adapted to interface with the application-specific base by physically mounting to the application-specific base.

6. The monitoring system of claim 5, wherein:
the application-specific base is adapted to upload the monitoring system application directly to the modular camera; and
the one or more application-specific components comprise a GPS, a visible spectrum imaging module, an infrared imaging module, a temperature sensor, a humidity sensor, an external motion sensor, an accelerometer, a microphone module, a mobile power source, a user interface, a cellular modem, a wireless networking interface, a speaker module, an audible alarm module, a visible alarm module, an infrared light emitting diode (LED) array, a visible spectrum LED array, a night light module, a pan/tilt adapter, a pan/tilt actuator, a lanyard adapter, and/or a wall mount adapter.

7. The monitoring system of claim 5, wherein:
the application-specific base comprises one or more application-specific components adapted to facilitate a type of monitoring corresponding to the application-specific base, the type of monitoring comprises one or more of mobile and/or fixed baby, elderly person, vehicular, and/or pet monitoring, home safety/automation monitoring, and industrial safety monitoring; and
the monitoring information comprises sensor data captured using at least one of the application-specific components according to the monitoring system application.

8. The monitoring system of claim 1, further comprising:
the application-specific base adapted to interface with the modular camera, wherein the application specific base comprises a communication module, a memory, and a processor in communication with the communication module and the memory, and wherein the processor of the application specific base is adapted to:
establish the communication link with the modular camera;
provide the monitoring system application, corresponding to the application-specific base, from the application-specific base to the modular camera, wherein the monitoring system application comprises machine executable software instructions executable by the modular camera to capture monitoring information; and
provide a remote monitoring system application, corresponding to the application specific base, to a personal electronic device, wherein the remote monitoring system application comprises an interface adapted to provide remote access to the monitoring information.

9. The monitoring system of claim 8, wherein:
the processor of the application specific base is adapted to provide the monitoring system application to the modular camera by uploading a code to the modular camera; and
the code identifies a location of the monitoring system application that is accessible by the modular camera.

10. The monitoring system of claim 8, wherein:
the processor of the application specific base is adapted to provide the remote monitoring system application to the personal electronic device by providing a code to the personal electronic device; and
the code identifies a location of the remote monitoring system application that is accessible by the personal electronic device.

11. The monitoring system of claim 8, wherein:
the application-specific base comprises one or more application-specific components adapted to facilitate a type of monitoring corresponding to the application-specific base;
the monitoring information comprises sensor data captured by at least one of the application-specific components according to the monitoring system application;
the processor of the application specific base is adapted to provide, to the modular camera, the sensor data; and
the one or more application-specific components comprise a GPS, a visible spectrum imaging module, an infrared imaging module, a temperature sensor, a humidity sensor, an external motion sensor, an accelerometer, a microphone module, a mobile power source, a user interface, a cellular modem, a wireless networking interface, a speaker module, an audible alarm module, a visible alarm module, an infrared light emitting diode (LED) array, a visible spectrum LED array, a night light module, a pan/tilt adapter, a pan/tilt actuator, a lanyard adapter, and/or a wall mount adapter.

12. The monitoring system of claim 8, further comprising the modular camera, wherein the modular camera is adapted to:
perform the monitoring system application to capture the monitoring information.

13. The monitoring system of claim 12, wherein:
the modular camera is adapted to interface with the application-specific base by physically mounting to the application-specific base;
the modular camera is adapted to download the monitoring system application directly from the application-specific base;
the modular camera comprises a smartphone; and
the smartphone comprises one or more imaging modules.

14. A method for a monitoring system comprising a modular camera, the method comprising:
establishing a communication link with an application-specific base, wherein the application-specific base is adapted to interface with the modular camera;
downloading a monitoring system application corresponding to the application specific base from the application-specific base to the modular camera, the monitoring system application comprising machine executable software instructions and the monitoring system application is downloaded from the application-specific base to the modular camera when the modular camera is physically mounted to the application-specific base; and
performing the monitoring system application by executing the software instructions to capture monitoring information, wherein the monitoring information comprises image data captured by the modular camera according to the monitoring system application.

15. The method of claim 14, further comprising:
determining an outdoor time of the modular camera from the monitoring information; and
wherein the performing the monitoring system application comprises capturing monitoring information comprising a current position of the modular camera and/or a series of positions of the modular camera and corresponding times.

16. The method of claim 14, further comprising:

determining, for the modular camera, an entry into, an exit from, a proximity to, or a presence within or without a specified geographic zone, from the monitoring information; and generating a corresponding alarm based on the determination; and wherein the specified geographic zone is defined by a geographic area and a period of time.

17. The method of claim 14, further comprising:

providing a remote monitoring system application, corresponding to the application specific base, to a personal electronic device, wherein the remote monitoring system application comprises an interface adapted to provide remote access to the monitoring information.

18. The method of claim 17, further comprising:

determining, for the modular camera, an entry into, an exit from, a proximity to, or a presence within or without a specified geographic zone, from the monitoring information; and providing a corresponding alarm to the interface of the remote monitoring system application based on the determination.

19. The method of claim 17, further comprising:

receiving a location of the personal electronic device;

determining, from the monitoring information, a driving, walking, and/or public transit routing from the location of the personal electronic device to the modular camera; and providing the routing to the personal electronic device.

20. The method of claim 17, further comprising:

receiving, by the modular camera, a remote communication request; and providing the remote communication request to a component of the modular camera, to the application-specific base, and/or to the personal electronic device.

* * * * *